United States Patent [19]

Herbline

[11] 4,173,538

[45] Nov. 6, 1979

[54] EXTINGUISHING PRODUCT COMPRISING AN UNINFLAMMABLE POWDER AND LIQUID

[76] Inventor: Celestin L. Herbline, Domaine Bracheux Fouquenies Oise, France

[21] Appl. No.: 913,987

[22] Filed: Jun. 9, 1978

Related U.S. Application Data

[63] Continuation-in-part of Ser. No. 705,977, Jul. 16, 1976, abandoned.

[30] Foreign Application Priority Data

Oct. 8, 1975 [FR] France ............................... 75 30866

[51] Int. Cl.[2] ............................................ C09K 3/28

[52] U.S. Cl. ........................................ 252/8; 252/2; 252/3; 252/8.05

[58] Field of Search ........................... 252/2, 3, 8, 8.05

[56] References Cited

U.S. PATENT DOCUMENTS

| | | | |
|---|---|---|---|
| 3,267,030 | 8/1966 | Dessart | 252/7 |
| 3,609,074 | 9/1971 | Rainaldi et al. | 252/3 |
| 3,655,554 | 4/1972 | Fink et al. | 252/3 |
| 3,957,657 | 5/1976 | Chisa, Jr. | 252/3 |
| 4,042,521 | 8/1977 | Dunn | 252/7 X |

FOREIGN PATENT DOCUMENTS

| | | | |
|---|---|---|---|
| 227557 | 10/1969 | Australia | 252/8 |
| 1211493 | 2/1966 | Fed. Rep. of Germany | 252/8 |
| 1168092 | 10/1969 | United Kingdom . | |
| 1236075 | 7/1971 | United Kingdom | 252/8 |
| 1349508 | 4/1974 | United Kingdom . | |

*Primary Examiner*—Leland A. Sebastian
*Attorney, Agent, or Firm*—Seidel, Gonda, Goldhammer & Panitch

[57] ABSTRACT

An extinguishing product comprises a mixture of an uninflammable powder and an uninflammable liquid in which the powder is insoluble wherein the powder has an apparent or bulk density smaller than the density of the liquid, and the powder is capable of absorbing at least about 75% of its weight of water while still remaining in powder form.

11 Claims, No Drawings

EXTINGUISHING PRODUCT COMPRISING AN UNINFLAMMABLE POWDER AND LIQUID

BACKGROUND OF THE INVENTION

This application is a continuation-in-part of U.S. Pat. application No. 705,977, filed July 16, 1976, now abandoned, of Celestin Leon Herbline for "An Extinguishing Product."

The present invention relates to an extinguishing product, and in particular to a product which can be thrown from a distance onto a fire. In addition, the product may be used preventively to stop the progression of a fire.

Extinguishing powders are already known which are capable of being thrown from a distance onto a fire. These powders are generally dispensed from a fire extinguishing apparatus which uses carbonic gas to throw the powder in the direction of the fire.

There are several drawbacks associated with the use of such known powders. The cloud generated by the powder considerably reduces the visibility where the powder is used. This generally prevents the person trying to extinguish the fire from locating the seat of the fire with accuracy. The reduced visibility caused by the cloud also reduces the ability of the person fighting the fire to escape rapidly from the area of the fire.

In addition, the known powders, if toxic, may cause poisoning upon being absorbed in the lungs. If non-toxic powders are selected, suffocation still remains a problem not only during use of the powder to extinguish fires, but also when filling the extinguisher.

The known powders have no damping effect upon light burning products, such as ignited ashes. Thus, the light burning products may be propelled by the air jet caused by the fire, resulting in the spread of the fire. This is particularly true when the extinguishing powder is ejected into the seat of the fire from a close distance. This problem cannot be easily overcome by moving away from the fire since the powders cannot be projected from a great distance.

In addition to the known extinguishing powders, other extinguishing products are known which are specifically designed for use on hydrocarbon fires. One product of this type is "light water" disclosed in U.S. Pat. No. 3,258,423 of Tuve et al., the disclosure of which is hereby incorporated herein by reference. Other information concerning "light water" is reported by R. Gouezec in "La Revue Technique du Feu" (1967).

"Light water" is a fire extinguishing agent comprising an aqueous foam having a non-combustible gas phase and an aqueous liquid phase which contain in solution perfluorocarbon foaming compounds of the type disclosed in the aforementioned patent. It is frequently used with sea water, briny water or soft water, and is particularly effective in extinguishing hydrocarbon fuel fires (category B) as well as fires of category A because of its damping action and its excellent penetration. The excellent extinguishing characteristics of compositions containing "light water" result from the sheet of foam which quickly covers the whole surface to be extinguished, even when the density of the extinguishing product is greater than the density of the burning combustible product.

An aqueous solution of the fire extinguishing composition flows from the foam and floats on the surface of the combustible product, such as hydrocarbon fuel. This allows the formation of a screen of vapor of the extinguishing composition which prevents the combustible product from reigniting, even when the continuity of the sheet of foam is interrupted. Because of these properties, fire extinguishing compositions containing "light water" can be applied to non-inflammed combustible materials to prevent them from burning in the first instance.

A fire extinguishing composition of the "light water" type is hereinafter referred to as a "tensio-active fluorocarbon product." The fire extinguishing efficiency of these tensio-active fluorocarbon products is very great, and greater than the fire extinguishing efficiency of protein-type foams. Their very good resistance to refiring seems to be due to the thickness of foam formed on the surface of a burning liquid. Nevertheless, it would be of great interest to increase the performance of tensio-active fluorocarbon products, in particular to notably increase the efficiency thereof when used with powdered extinguishers. It is also desired to minimize the risks of reigniting a combustible substance by increasing the thickness of the protecting layer which is formed on its surface.

Halogenated extinguishing products are also known. These products are used by mixing them with a liquid, water for example, and by projecting the mixture at a distance onto the fire in the form of a frozen mud or foam.

In a particular case, the halogenated product is compressed chlorobromodifluoromethane which is then a liquid under the pressure of a gas, such as nitrogen for example. In use, the halogenated product is mixed with a liquid, such as water or oil, contained in another vessel. Then the mixture is ejected into the air so that the chlorobromodifluoromethane evaporates, generating snow which turns an ice product known as "Neve." Real blocks of ice containing the chlorobromodifluoromethane may be thrown onto a fire from very great distances.

The main drawbacks concerning halogenated products are the possibility of decomposition of the products obtained, the toxicity thereof, as well as their small density which makes it difficult to throw them onto a fire from a great distance. Most of these drawbacks do not exist when using the extinguishing products of the present invention. In addition, the extinguishing efficiency of the halogenated extinguishing products may be significantly increased and possible evaporation of the product delayed as long as possible by using these products in conjunction with the extinguishing products of the present invention.

Numerous other extinguishing products are known, but the few examples discussed hereinbefore have been selected as representative of the type whose efficiency can be greatly increased by using them along with the extinguishing products according to the present invention.

SUMMARY OF THE INVENTION

The present invention comprises a mixture of an uninflammable powder and an uninflammable liquid in which the powder is insoluble, wherein the powder has an apparent or bulk density smaller than the density of the liquid, and the powder is capable of absorbing at least about 75% of its weight of water while still remaining in powder form.

The extinguishing products of the present invention may be used in standard apparatus, and in particular, in apparatus in which standard extinguishing powders are used. This makes it possible to minimize costs incurred by industrial and individual users of the extinguishing product. The extinguishing product of the present invention may be kept in closed vessels for several years without losing its extinguishing capacity and other properties.

The extinguishing products of the present invention may be thrown upon a fire from a very great distance. In addition, they may be used in the vicinity of the seat of the fire without causing the burning particles to be propelled away from the fire by the air jet caused by the fire due to their excellent damping capacity. The extinguishing products may be used to extinguish any type of fire. The products form a refractory layer on horizontal, vertical or oblique surfaces and will remain applied for several hours, days, and even several months.

The extinguishing products of the present invention contain components which do not evaporate or sublimate and which do not deteriorate in the absence of fire, so that the progression of a fire is stopped when the fire contacts the product. When the product is thrown onto the seat of a fire, a thick layer of the extinguishing product is formed thereon. The layer is thicker than that formed by the extinguishing products of the "light water" type alone and most of the other products already known, particularly when used on liquid hydrocarbon fires.

The extinguishing products of the present invention are substantially non-toxic, capable of being easily mixed, have good damping characteristics, may be projected from a great distance onto a fire by standard extinguishing equipment, and may be readily mixed with other fire extinguishing products so that the extinguishing effect thereof can be optimized depending on the type of components therein and the type of fire to be extinguished.

DESCRIPTION OF THE PREFERRED EMBODIMENTS

In its broadest aspect, the present invention relates to an extinguishing product comprising a mixture of an uninflammable powder and an uninflammable liquid in which the powder is insoluble, the powder being capable of absorbing at lest about 75% of its weight of water, and having an apparent or bulk density less than the density of the liquid.

A great number of powders can be used in the extinguishing products according to the present invention, so long as the powders are uninflammable, insoluble in the liquid to which they are added, are capable of absorbing at least 75% of their own weight of water, and have an apparent or bulk density much less than the density of the liquid.

Preferred powders are anti-clodding agents which have a great absorbing power. An anti-clodding agent is a product which, at proportions of less than 3% of a hygroscopic product to which it is added, prevents or inhibits agglomeration and caking of such product.

The anti-clodding agents may also belong to the category of "packaging products" or "conditioning agents." These are powders which are capable of turning a liquid or pasty product into a powder when the conditioning agent is present in proportions ranging up to about 30% of the product to be processed.

Preferred anti-clodding and conditioning agents are powders such as silica, alumina and silico-sodium aluminates. Among the preferred anti-clodding and conditioning agents, commercially available silico-sodium aluminates sold under the trademarks "TIX.O.LEX 28" and "TIX.O.LEX 78" and precipitated silica sold under the trademark "TIX.O.SIL 38" provide excellent results in the fire extinguishing compositions of the present invention. In addition to being anti-clodding and conditioning agents, these silico-sodium aluminates and precipitated silica are non-toxic, odorless, tasteless, do not become spoiled and are particularly stable. These characteristics have resulted in these powders being used as additives in some powdered food products.

Until now, these products have been applied in particular to ingredient industries for manufacturing rubber, plastic materials, and resins, powdered chemical products, recovery products, fish wastes, sulfur, fertilizers, powdered foods for man and animals, casein, powdered soap, dentrifices, powdered products for automatic machines; but no application as components of extinguishing products has been contemplated.

Some of the other characteristics of these powders which make them particularly suitable for use in the fire extinguishing compositions of the present invention are that they are uninflammable and insoluble in the desired liquid. They are also very light, so that they may be carried a great distance by the liquid component of the composition under the action of a shock, such as gas, for example. In addition, they prevent the product from forming a paste which is likely to harden so as to obstruct pipes. Thus, these powders can absorb a sufficient amount of liquid to be carried or ejected in powder form.

The surface characteristics, granularity and fineness of the powder particles enables them to be easily mixed together, as well as with additional components. Moreover, their surface characteristics enable them to strongly adhere to the products to be processed, so that the formation of dust is prevented during mixing. These characteristics also prevent loss of efficiency due to the settling of the powder at the bottom of packages during handling.

The great number of particles and their small diameter make it possible to coat the particles of the product to be packaged, so that a good adherance is obtained and the number of direct contacts between particles is limited. By this means, it is possible to reduce agglomeration or gathering of crystal particles together so that a mass is not formed.

Of great importance is the ability of these powders to absorb a great deal of liquid. The particularly preferred silico-sodium aluminates and precipitated silica powders are capable of absorbing between about 75 and about 120% of their weight of water and can absorb to 93% of their volume of water and still remain an easily flowing powder.

The preferred powders, comprising silica, silico-sodium aluminates and silicates of soda have the characteristics referred to hereinbefore. Each of the powders has an actual density of about 2, but because of their surface characteristics, they have a much lower apparent or bulk density. The presently preferred precipitated silica and silico-sodium aluminates have an apparent or bulk density of about 0.25 to 0.3 g/cc.

These preferred powders are prepared by a precipitation process well known to those skilled in the art. The following table sets forth the chemical analysis and characteristic properties of the three powders which are presently preferred for use in the fire extinguishing compositions of the present invention:

Table 1

| | TIX.0. LEX 28 | TIX.O. LEX 78 | TIX.O. SIL 38 |
|---|---|---|---|
| $SiO_2$ | 80.2 | 80.3 | 96.9 |
| $H_2O$ combined | 4.8 | 4.5 | 3.1 |
| $Al_2O_3$ | 9.3 | 9.7 | |
| $Na_2O$ | 5.7 | 5.5 | |
| Characteristic Properties: | | | |
| Loss of fire (900°)% | 13 max. | 15 max. | 12 max. |
| Dean Stark % | 8 max. | 10.5 max. | 9 max. |
| pH (5 g/100cc) | about 10.5 | about 7.5 | about 7 |
| Photovolt Whiteness | 98 min. | 97 min. | 98 min. |
| Spec. Surface BET (m2/g) | about 135 | about 225 | about 90 |
| 0 ultimate particles (m/u) | about 25 | about 15 | about 20 |
| Actual density (g/cc) | 2 | 2 | 1.95 |
| Sacked apparent density (g/cc) | 0.3 | 0.25 | 0.25 |
| D.O.P. setting (cc/100g) | 180 min. | 220 | 280 min. |
| White Spirit setting (cc/100g) | 400 min. | 450 | 600 min. |
| Oversize 325 Mesh % | 4 max. | 4 max. | 10 max. |
| Oversize 100 Mesh % | 0.01 max. | 0.01 max. | 0.01 max. |
| Absorbed water at 75% RH* | 15% min. | 15% min. | 10% min. |
| 90% RH | 45% min. | 45% min. | 35% min. |
| 95% RH | 67% min. | 95% min. | 80% min. |

*Relative Humidity

The liquid component of the extinguishing products of the present invention is selected depending on the type of fire to which the product is to be applied. Almost any liquid can be used so long as it is uninflammable and has a density greater than the apparent density of whatever powder is used to form the powdered component of the composition. By way of example, the liquid can be pure water, briny water, sea water, animal, vegetable or mineral oils, such as the halogenous pyroforane 1301 boiling at −57° C. whose formula is $CF_3Br$ or halogenated hydrocarbon liquids, such as chlorobromodifluoromethane, and the like.

The present invention includes mixtures of liquids, as well as mixtures of powders. Thus, for example, mixtures of liquids of the type listed above may contain a tensio-active fluorocarbon product, such as "light water." The combination of a liquid with a tensio-active fluorocarbon product is particularly preferred when the product is intended for use in extinguishing inflamed liquid hydrocarbons.

Where it is desired to extinguish burning metals, such as magnesium, aluminum, etc., the extinguishing product is particularly effective if the liquid component is a mineral oil by itself having a high ignitiion point, or a mineral oil mixed with other liquids, such as "Fyrquel," a triaryl phosphate lubricant and hydraulic fluid, available from Stauffer Chemical Company, which at 816° C. provides an emission of smoke without ignition or combustion.

Even when the liquid component of the extinguishing product is water, the presence of a mineral oil in the extinguishing product aids in reducing evaporation of the water from the extinguishing product.

Depending on the type of fire to be extinguished, the tensio-active fluorocarbon product can be substituted by various adhesive products, such as Fyrquel which can be mixed for example with the $CF_3Br$ or any suitable damping product. The product obtained is always in the form of a powder due to absorption of the liquids by the powdered component which has a high absorption capability.

The liquid or liquids used in the present invention can have widely varying densities, generally up to about 3 g/cc. Liquids having densities of about 1 to about 1.8 g/cc are preferred. The only requirement is that the density of the liquid be greater than the apparent or bulk density of the powder being used in the particular formulation.

The present invention will now be described in more detail with reference to the following specific, non-limiting examples of suitable fire extinguishing compositions designed to constitute extinguishing products for 10 liter extinguishers.

EXAMPLE 1

| Ingredient | Amount |
|---|---|
| TIX.O.SIL 38 | Kg |
| Light Water | 0.5 liters |
| Mineral Oil | 50 cc |
| Water | Balance |

EXAMPLE 2

| | |
|---|---|
| TIX.O.SIL 38 | 4 Kg |
| Light Water | 0.5 liters |
| Mineral Oil | 30 cc |
| Water | Balance |

The ingredients in the examples are mixed in any suitable container, which may be a portion of the extinguishing apparatus or a separate container.

The powdered ingredients are placed in the container, followed by the mineral oil and light water or other additives. Then, the main liquid ingredient, whether it is water, oil, halogenated liquid, mixtures of liquids, or the like, is added to the container. The mixture is then agitated, and if not being mixed in the extinguisher apparatus, poured into the extinguisher apparatus. A bottle of carbonic gas is then positioned in the appropriate location on the extinguisher apparatus and the assembly closed. The device is then ready to operate.

After the mixture is formed, there is no problem with degradation or decomposition of the product, although the powdered material will tend to settle at the bottom of the extinguishing apparatus. Due to the type of powders used, the settled material is not in the form of a hard, agglomerated mass. Rather, the deposit will be mixed with the surrounding liquid under the influence of the strong action of the carbonic gas when the extinguisher is used, the mixture being turned into a type of mud.

The product is preferably applied to a fire by an extinguisher carrying a Giffard, a type of injector located at the end of the pipe. Thanks to the air-intake, the action of the Giffard facilitates the formation of the product into an extinguishing foam or an extinguishing mastic, like a light plaster. The extinguishing product made in accordance with the present invention can be projected by the extinguisher from a distance of several feet and will adhere even on vertical walls for several months.

The layer formed on inflamed hydrocarbons by the product containing "light water" has a thickness 4 or 5 times that obtained with standard extinguishing products containing "light water."

Where the products are intended for use in cold environments, a suitable compatible antifreeze ingredient, such as calcium chloride, can be added in an effective amount to prevent the products from freezing.

The extinguishing products of the present invention should be substantially non-toxic, which means they are not physiologically dangerous as used under the conditions normally encountered in extinguishing fires.

The present invention may be embodied in other specific forms without departing from the spirit or essential attributes thereof and, accordingly, reference should be made to the appended claims, rather than to the foregoing specification as indicating the scope of the invention.

I claim:

1. A substantially non-toxic extinguishing product capable of forming a refractory coating on a surface consisting essentially of an uninflammable powder selected from the group consisting of silica, alumina, silico-sodium aluminate, silicates of soda and mixtures thereof and an uninflammable liquid in which the powder is insoluble, the powder having an apparent density less than the density of the liquid and being capable of absorbing at least about 75% of its own weight of water and still remain in powdered form.

2. A product according to claim 1 wherein the liquid is selected from the group consisting of water; briny water; sea water; uninflammable animal, vegetable and mineral oils; halogenated hydrocarbons; and mixtures thereof.

3. A product according to claim 2 wherein the halogenated hydrocarbon is chlorobromodifluoromethane.

4. A product according to claim 1 wherein the liquid includes a tensio-active fluorocarbon product.

5. A product according to claim 1 wherein the powder has an apparent density of about 0.25 to about 0.3 g/cc and the liquid has a density of about 1 to 1.8 g/cc.

6. A product according to claim 1 wherein the powder has an apparent density of about 0.25 to about 0.3 g/cc and the liquid has a density of about 1 g/cc.

7. A product according to claim 1 wherein the powder is capable of absorbing between 75 and 120% of its own weight of water.

8. A product according to claim 1 wherein the powder is capable of absorbing up to about 93% of its own volume of water.

9. A product according to claim 1 wherein the powder is a silico-sodium aluminate having an apparent density of about 0.3 g/cc, a pH (5 g/100 cc) of about 10.5, a surface BET of about 135 $m^2/g$ and a particle size such that about 96% of the powder particles passes through a 325 mesh screen.

10. A product according to claim 1 wherein the powder is a silico-sodium aluminate having an apparent density of about 0.25 g/cc, a pH (5 g/100 cc) of about 7.5, a surface BET of about 225 $m^2/g$ and a particle size such that about 96% of the powder particles passes through a 325 mesh screen.

11. A product according to claim 1 wherein the powder is precipitated silica having an apparent density of about 0.25 g/cc, a pH (5 g/100 cc) of about 7, a surface BET of 90 $m^2/g$ and a particle size such that about 90% of the powder particles passes through a 325 mesh screen.

* * * * *